United States Patent
Tamazawa et al.

(10) Patent No.: US 6,372,866 B2
(45) Date of Patent: *Apr. 16, 2002

(54) PROCESS FOR PRODUCING CATIONIC EMULSION

(75) Inventors: Mitsuo Tamazawa, Matsudo; Nobuyuki Urushibara, Chiba; Yasuo Kuroda, Tokyo, all of (JP)

(73) Assignee: Taisei Chemical Industries, Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/291,184

(22) Filed: Apr. 14, 1999

(30) Foreign Application Priority Data

Mar. 1, 1999 (JP) .......................... 11-053285

(51) Int. Cl.$^7$ .......................... C08F 8/32; C08F 271/00; C04D 5/02; C04D 163/00
(52) U.S. Cl. .......................... 526/75; 524/802; 526/87; 526/201; 526/273; 525/327.3; 525/328.2; 525/355
(58) Field of Search .......................... 524/802; 526/75, 526/201, 87, 273; 525/327.3, 328.2, 355

(56) References Cited

U.S. PATENT DOCUMENTS 4,308,189 A * 12/1981 Moritano et al. ... 260/29.6 WA

FOREIGN PATENT DOCUMENTS

| JP | 06-1680 | 1/1994 | |
|----|---------|--------|---|
| JP | 06-1928 | 1/1994 | |
| JP | 06-001928 | * 1/1994 | ............ C09D/5/02 |

OTHER PUBLICATIONS

Nippon Secchaku Kyokai–Shi, vol. 22, No. 5, (1986) pp. 34–39.

Shikizai, vol. 60(5), (1987) pp. 281–289.

* cited by examiner

Primary Examiner—David W. Wu
Assistant Examiner—Kelechi Egwim
(74) Attorney, Agent, or Firm—Paul E. White, Jr.; Manelli Denison & Selter PLLC

(57) ABSTRACT

A process for producing a cationic emulsion stable to alkalis having an average particle diameter of 0.01 to 0.1 micron, in which, using as an emulsifier, a water-soluble polymer $A_2$ obtained by subjecting a polymer $A_1$ obtained by copolymerizing an amino group-containing compound with a compound copolymerizable therewith in the presence of a polymerization initiator, to neutralization with an organic or inorganic acid, a specific epoxy group-containing acrylate compound (c) and a compound copolymerizable therewith are subjected in combination to emulsion polymerization in the presence of a redox catalyst system in water as a medium to obtain an emulsion D; the emulsion D is then reacted with epichlorohydrin. The cationic emulsion is coated on paper, a film, or a strongly alkaline substrate to impart water resistance.

8 Claims, 1 Drawing Sheet

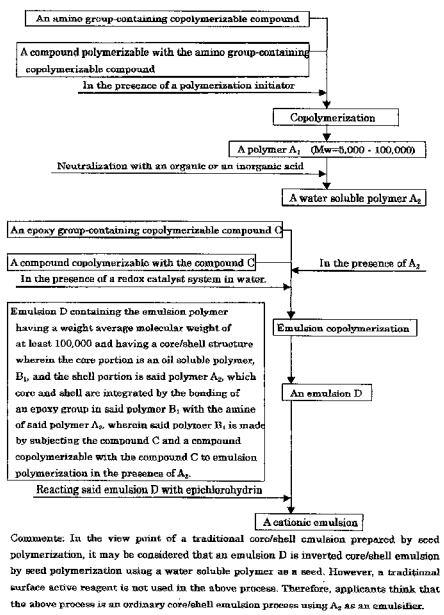

Figure 1

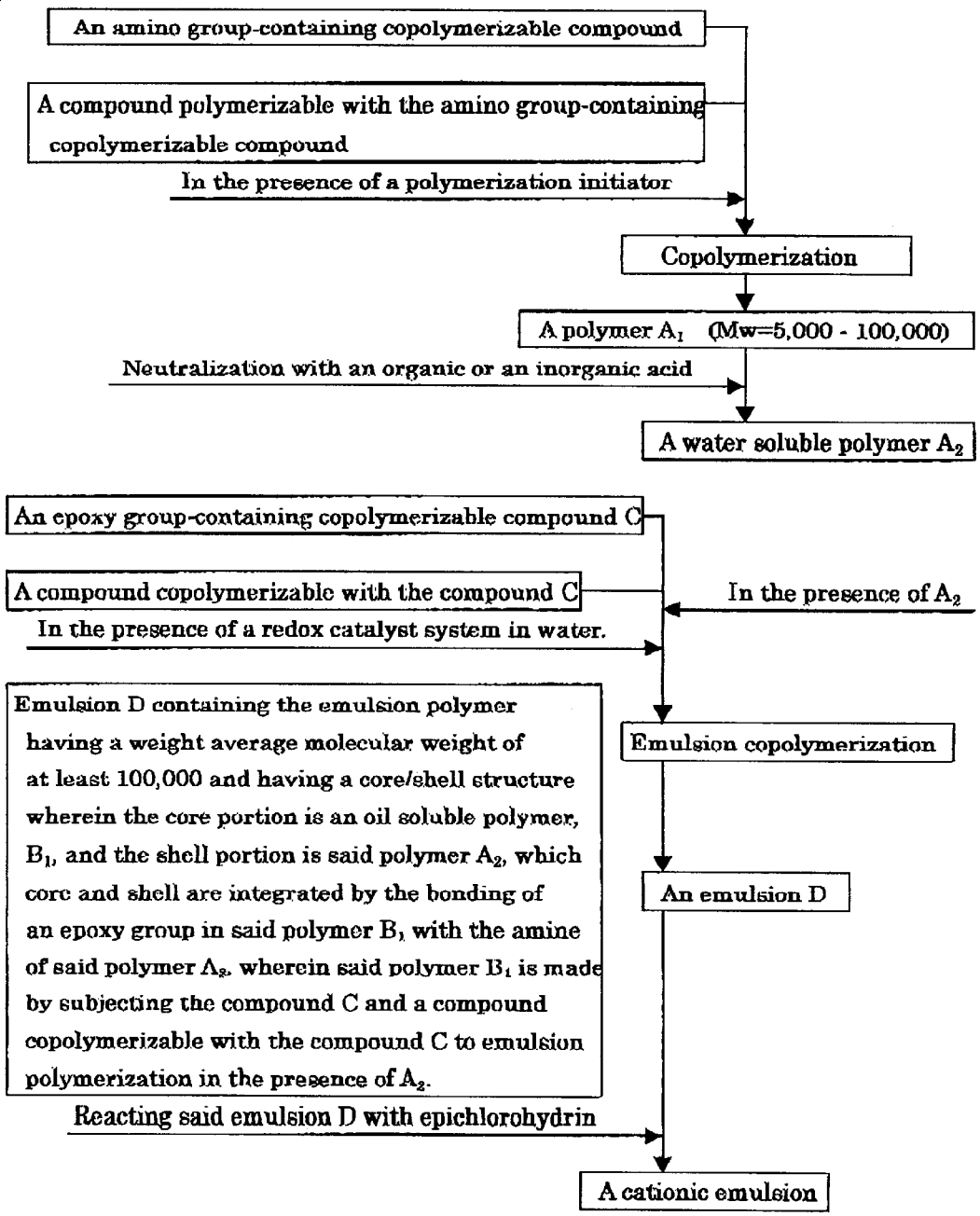

Comments: In the view point of a traditional core/shell emulsion prepared by seed polymerization, it may be considered that an emulsion D is inverted core/shell emulsion by seed polymerization using a water soluble polymer as a seed. However, a traditional surface active reagent is not used in the above process. Therefore, applicants think that the above process is an ordinary core/shell emulsion process using $A_2$ as an emulsifier.

PROCESS FOR PRODUCING CATIONIC EMULSION

BACKGROUND OF THE INVENTION

This invention relates to a process for producing an emulsion for a coating material to be applied to paper, a plastic film or an inorganic substrate and to an emulsion produced by the above production process. More particularly, it relates to a process for producing a cationic emulsion which is stable to alkalis, has a small average particle size and can be cured at ordinary temperature, and consequently gives good water resistance and good permeability to a strongly alkaline substrate such as an inorganic substrate or the like when coated and which further can provide such a function as a coating material that when the emulsion is coated on paper or a film, its adherability thereto and water resistance are developed, and also relates to a cationic emulsion produced by the production process.

As materials to be coated on a substrate for forming a coating film, solvent type resin compositions have heretofore been used. However, the above solvent type resin compositions have problems with safety and regulation for volatile organic solvent, and as substitutes therefor, water-soluble resins and emulsion resin compositions have been used. As an example thereof, proposed is a cationic microemulsion which comprises fine particles having particle diameters of not more than 0.1 microns and which has a cross-linkability at ordinary temperature and forms a dense coating film having a gloss close to that in the case of the solvent type resin composition. However, with the above microemulsion, a large amount of an emulsifier must be used for making the particle diameter 0.1 microns or less, and consequently, the above cationic microemulsion is disadvantageous in that its water resistance becomes remarkably inferior and in other respects.

Recently, there has been proposed a cationic emulsion having a core/shell structure formed by effecting emulsion-polymerization using a water soluble resin and also an epoxy group without any emulsifier (for example, JP-A-Hei 6(1994)-1,680 and JP-A-Hei 6(1994)-1,928). However, even in these cases, how to use the water soluble resin as the shell component is a great factor, the curing rate is not sufficient and a lot of time is required until water resistance is developed. In addition, when the proportion of the water-soluble resin is increased for ensuring the stability, the water resistance is remarkably deteriorated, and hence, the development of those which can be used without anxiety is now awaited.

SUMMARY OF THE INVENTION

An object of this invention is to provide a cationic emulsion which has a good adherability to paper, plastic film or inorganic substrate and is excellent in water resistance and long-term stability.

Another object of this invention is to provide a process for producing the above cationic emulsion.

A still another object of this invention is to provide an article coated with the above cationic emulsion.

Other objects and advantages of this invention will become apparent from the following description.

The present inventors have continued research for the establishment of a process for producing a cationic emulsion which is endowed with both water resistance and adherability to various substrates, the emulsion characteristics of which are excellent in both property and physical property and stable and for the development of said cationic emulsion and have consequently grasped that said emulsion can be produced by adopting the following technique.

It is needless to say that the emulsion stable to alkalis is cationic; however, the present inventors have found that the object can be successfully achieved only when the following (1) to (3) are combined on the above premise, whereby this invention has been accomplished:

(1) The emulsion is required to be of fine particles in order to increase the permeability and for this purpose, it is necessary to increase the amount of a water-soluble resin used as the shell component; however, when this amount is increased, the water resistance is deteriorated, so that it is necessary to bond the core portion to the shell portion.

(2) In order to ensure the adhesiveness, it is effective to introduce an epoxy group. In this case, the object is substantially achieved by selectively subjecting the chlorine atom of epichlorohydrin as used to reaction at a temperature not higher than ordinary temperature; however, the reaction requires a long period of time and consequently the production man-hour becomes large. This is disadvantageous. Moreover, in this technique, the epoxy group is alive, and hence, the storage stability at high temperatures cannot be secured. This is not desirable. Accordingly, it has been examined how much the stability is adversely affected by subjecting epichlorohydrin to reaction at a high temperature to allow the epoxy group to react selectively and thereafter spontaneously reacting the chlorine atom whose reaction rate is low, whereby it has been ascertained that both the ensuring of stability and the ensuring of adhesiveness can stand together without any trouble.

(3) If necessary, an amphoteric water-soluble resin having both cation and anion can be used as the shell component in order to obtain excellent stability, adhesiveness and water resistance.

According to this invention, there is provided a process for producing a cationic emulsion which is stable to alkalis and has an average particle diameter of 0.01 to 0.1 micron, in which using, as an emulsifier, a water-soluble polymer $A_2$ obtained by subjecting a polymer $A_1$ having a weight average molecular weight of 5,000 to 100,000 obtained by polymerizing an amino group-containing, polymerizable compound and a compound copolymerizable therewith in the presence of a polymerization initiator, to neutralization reaction with an organic or inorganic acid in a proportion of 0.5 to 1.5 equivalents per equivalent of the amino group brought about by the above amino group-containing, polymerizable compound, an epoxy group-containing, polymerizable compound C represented by the general formula (I):

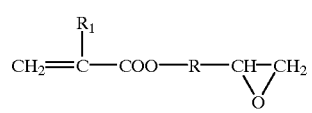

(I)

wherein $R_1$ represents H or a methyl group and R represents a straight chain or branched chain alkyl group having 1 to 10 carbon atoms and a compound copolymerizable with the compound C are subjected in combination in a proportion of 0.01 to 0.5 equivalent per equivalent of the above amino group as elements to constitute an oil-soluble core portion $B_1$ to emulation polymerization in the presence of a redox catalyst system in water as a medium to obtain an emulsion D having a weight average molecular weight of at least 100,000 and having a core/shell structure in which the core portion and the shell portion are integrated by the bonding of the above amino group to the above epoxy group; this emulsion D is then reacted with epichlorohydrin in an amount of at least 0.5 equivalent per equivalent of the amino group at 20 to 100° C. to selectively add the epoxy group to the amino group; and thereafter, the chlorine atom resulting from the epichlorohydrin is reacted with the amino group.

According to this invention, there is further provided a cationic emulsion of an average particle diameter of 0.01 to 0.1 micron stable to alkalis produced by the above-mentioned production process.

According to this invention, there is still further provided an article coated with the above cationic emulsion.

BRIEF DESCRIPTION OF THE DRAWINGS

FIG. 1 is a flowchart of process steps/components of the present invention.

DETAILED DESCRIPTION OF THE INVENTION

The polymer $A_1$ used in this invention is a polymer having a weight average molecular weight of 5,000 to 100,000 obtained by solution-polymerizing an amino group-containing, polymerizable compound and a compound copolymerizable therewith in the presence of a conventional polymerization initiator at a temperature of 70 to 180° C. in a known manner.

The amino group-containing, polymerizable compound includes, for example, acrylates such as dimethyl-aminomethyl acrylate, diethylaminomethyl acrylate, dibutyl-aminomethyl acrylate, dihexylaminomethyl acrylate, dimethylaminoethyl acrylate, diethylaminoethyl acrylate, di-t-butylaminoethyl acrylate, diisohexylaminoethyl acrylate, dihexylaminopropyl acrylate, di-t-butylaminohexyl acrylate and the like; corresponding methacrylates; and the like, and these can be used alone or in admixture.

The amino group-containing, polymerizable compound is required to be used in a proportion of at least 10% by weight of the elements constituting the polymer $A_1$. When the proportion is less than 10% by weight of the constituting elements, the emulsifying force of the water-soluble polymer $A_2$ for an oil-soluble polymer $B_1$ constituting the oil-soluble core portion $B_1$ is, in some cases, not exerted at all or not sufficient.

The polymerization initiator used in this invention may be a conventional one, which includes azo type polymerization initiators such as azobisisobutyronitrile and the like; peroxide type polymerization initiators such as benzoyl peroxide and the like; etc. These can be used alone or in admixture.

The compound copolymerizable with the amino group-containing, polymerizable compound used in this invention includes, for example, alkyl or cycloalkyl esters of acrylic or methacrylic acid such as methyl acrylate, methyl methacrylate, ethyl acrylate, ethyl methacrylate, n-butyl acrylate, n-butyl methacrylate, i-butyl acrylate, i-butyl methacrylate, t-butyl acrylate, t-butyl methacrylate, cyclohexyl acrylate, cyclohexyl methacrylate, 2-ethylhexyl acrylate, 2-ethylhexyl methacrylate, lauryl acrylate, lauryl methacrylate and the like; vinyl monomers such as styrene, vinyltoluene, a-methylstyrene, vinyl acetate, acrylonitrile, methacrylonitrile and the like; hydroxyalkyl esters of acrylic or methacrylic acid such as 2-hydroxyethyl acrylate, 2-hydroxyethyl methacrylate, hydroxypropyl acrylate, hydroxypropyl methacrylate and the like, and these can be used alone or in admixture.

The solvent which can be used in the solution polymerization in this invention includes, for example, aromatic compounds such as toluene, xylene and the like; ketones such as acetone, methyl ethyl ketone, methyl isobutyl ketone and the like; alcohols such as normal butanol, isobutanol, isopropyl alcohol and the like; esters such as ethyl acetate, n-butyl acetate and the like; etc. These can be used alone or in admixture. However, alcohols in which the polymer $A_1$ is well dissolved are preferable.

The water-soluble polymer $A_2$ used in this invention is a water-soluble polymer obtained by reacting the polymer $A_1$ with an organic or inorganic acid in a proportion of 0.5 to 1.5 equivalents per equivalent of the amino group of the polymer $A_1$.

The organic or inorganic acid used above includes, for example, organic acids such as formic acid, acetic acid, oxalic acid and the like and inorganic acids such as hydrochloric acid, sulfuric acid, nitric acid and the like. These can be used alone or in admixture.

The oil-soluble polymer $B_1$ constituting the oil-soluble core portion $B_1$ in this invention is an oil-soluble polymer having a weight average molecular weight of at least 100,000 obtained by diluting the polymer $A_2$ with water and subjecting the diluted polymer $A_2$ together with at least one polymerizable compound and a conventional polymerization initiator to emulsion polymerization in the presence of a redox catalyst system in a known manner under a nitrogen stream at a temperature of 70 to 100° C.

The emulsion D used in this invention has a core/shell structure in which the shell portion is made of the water-soluble polymer $A_2$ and the core portion $B_1$ is made of the oil-soluble polymer $B_1$ and has, in the core and shell portions, an amine-epoxy bonding portion formed by reacting the water-soluble polymer $A_2$ with an epoxy group-containing, polymerizable compound in a proportion of 0.01 to 0.5 equivalent per equivalent of the amino group of the water-soluble polymer $A_2$. Moreover, the reaction between amine and epoxy is allowed to proceed simultaneously with the above reaction for forming the oil-soluble polymer $B_1$ to obtain the emulsion.

The proportion of the water-soluble polymer $A_2$ in the emulsion D of this invention can be freely selected from the range of 10 to 90% by weight of the weight of the components constituting the emulsion D.

When the proportion of the water-soluble polymer $A_2$ is less than 10% by weight of the weight of the components constituting the emulsion D, the emulsifying force of the polymer $A_2$ is, in some cases, not exerted at all or not sufficient, and when the proportion exceeds 90% by weight, the viscosity increases during the emulsion polymerization, so that a proportion of 30 to 70% by weight is preferable.

The cationic emulsion of this invention is a cationic emulsion obtained by subjecting epichlorohydrin to addition to the emulsion D in a proportion of at least 0.5 equivalent per equivalent of the amino group of the emulsion D at a temperature of 20 to 100° C.

When the temperature is within the above range, the higher the temperature, the shorter the reaction time can be made; however, care must be taken of the method of adding epichlorohydrin. This step (as shown in FIG. 1) is the important point of this invention and in the vicinity of 20° C., the selective reaction of epoxy group is a little and the reaction of chlorine atom proceeds in parallel thereto, so that the temperature is preferably at least 40° C.

In the cationic emulsion of this invention, the proportion of epichlorohydrin can be freely set in the range of at least 0.5 equivalent per equivalent of the amino group; however, when the proportion is less than 0.5 equivalent, the stability of the varnish prepared from the cationic emulsion to alkalis is, in some cases, not exerted at all or not sufficient, and hence, a proportion of at least 1.0 equivalent is preferable.

A carboxyl group-containing, polymerizable compound used in this invention includes, for example, α, β-ethylenically unsaturated carboxylic acids, such as acrylic acid, methacrylic acid, itaconic acid, maleic acid and the like and these can be used alone or in admixture.

A hydroxyl group-containing, polymerizable compound used in this invention includes hydroxyalkyl esters of acrylic or methacrylic acid as mentioned above as examples of the compounds copolymerizable with the amino-group-containing, polymerizable compound and these can be used alone or in admixture.

The polymer $A_1$ may contain a reactive prepolymer $E_2$ having a polymerizable double bond and both amino group and acid group obtained by subjecting a prepolymer $E_1$ having a weight average molecular weight of 1,000 to 30,000 obtained by copolymerizing an amino group-containing, polymerizable compound with a compound copolymerizable therewith using a terminal carboxyl group-containing polymerization initiator, to reaction with the epoxy group-containing, polymerizable compound C represented by the general formula (I) in a proportion of 0.1 to 1.0 equivalent per equivalent of the amino group of the prepolymer $E_1$.

The above prepolymer $E_1$ is a prepolymer having a weight average molecular weight of 1,000 to 30,000 obtained by subjecting to solution polymerization an amino group-containing, polymerizable compound and a compound copolymerizable therewith in the presence of a terminal carboxyl group-containing polymerization initiator or a conventional polymerization initiator at a temperature of 80 to 180° C. under a nitrogen gas stream.

The terminal carboxyl group-containing polymerization initiator used above includes, for example, 4,4'-azobis-4-cyanovaleric acid and the like.

As the amino group-containing, polymerizable compound used above, those mentioned as to the polymer $A_1$ can be used alone or in admixture.

The proportion of the amino group-containing, polymerizable compound in the prepolymer $E_1$ is required to be at least 30% by weight of the weight of the elements constituting the prepolymer $E_1$, and when the proportion is less than 30% by weight, pigment is, in some cases, not dispersed at all or not sufficiently dispersed in the emulsion obtained.

As the above compounds copolymerizable with the amino group-containing, polymerizable compound, those mentioned as to the polymer $A_1$ can be used alone or in admixture.

In this invention, for example, in the solution polymerization, as the solvent, water and those similar to the solvents mentioned as to the polymer $A_1$ can be used alone or in admixture.

The molecular weight of the prepolymer $E_1$ can be freely selected from the range of 1,000 to 30,000; however, when the molecular weight is less than 1,000, acidic pigment is not sufficiently dispersed in the emulsion and when the molecular weight exceeds 30,000, the stability of coating composition becomes inferior with some pigments, so that a molecular weight of 1,500 to 10,000 is preferable.

The reactive prepolymer $E_2$ used in this invention is a polymerizable, reactive prepolymer having a polymerizable double bond and both amino group and acid group obtained by subjecting to addition reaction the prepolymer $E_1$ and the epoxy group-containing, polymerizable compound C represented by the general formula (I) in a proportion of 0.1 to 1.0 equivalent to equivalent of the amino group of the prepolymer $E_1$, in the presence of a polymerization inhibitor and a tertiary amino compound under a nitrogen 93%/oxygen 7% mixed gas stream at a temperature of 80 to 200° C.

The epoxy group-containing, polymerizable compound C used in this invention includes glycidyl acrylate, glycidyl methacrylate and the like represented by the general formula (I) and these can be used alone or in admixture.

The polymerizable double bond can be introduced into the prepolymer $E_1$ by reacting the prepolymer $E_1$ with the epoxy group-containing, polymerizable compound in any proportion in the range of 0.1 to 1.0 equivalent per equivalent of the amino group of the prepolymer $E_1$; however, when the proportion exceeds 0.5 equivalent, gelation is caused in some cases when the reactive prepolymer $E_2$ is copolymerized with at least one polymerizable compound and hence a proportion of 0.1 to 0.5 equivalent per equivalent of the amino group is preferable.

The prepolymer $A_1$ may contain a reactive prepolymer $F_2$ obtained by subjecting a prepolymer $F_1$ having a weight average molecular weight of 1,000 to 30,000 obtained by copolymerizing a carboxyl group-containing, polymerizable compound with a compound copolymerizable therewith in the presence of a terminal carboxyl group-containing initiator and/or at least one other polymerization initiator, to reaction with the epoxy group-containing, polymerizable compound C represented by the general formula (I) in a proportion of 0.1 to 1.0 equivalent per equivalent of the carboxyl group of the prepolymer $F_1$.

The prepolymer $F_1$ used above is a prepolymer having an average molecular weight of 1,000 to 30,000 obtained by subjecting to solution polymerization a carboxyl group-containing, polymerizable compound and a compound copolymerizable therewith in the presence of a terminal carboxyl group-containing initiator and a conventional polymerization initiator at a temperature of 80 to 180° C. under a nitrogen gas stream in a known manner.

The terminal carboxyl group-containing polymerization initiator used above includes those mentioned as to the prepolymer $E_1$ and the conventional polymerization initiator used above includes polymerization initiators of azo type such as azobisisobutyronitrile and the like; of peroxide type such as benzoyl peroxide and the like; and of the like type, and these can be used alone or in admixture.

The carboxyl group-containing, polymerizable compound used above includes, for example, acrylic acid, maleic acid, itaconic acid, 2-acryloyloxyethylsuccinic acid, 2-acryloyloxyethylphthalic acid, 2-methacryloyloxyethylsuccinic acid, 2-methacryloyloxyethylphthalic acid and the like and these can be used alone or in admixture.

The proportion of the carboxyl group-containing, polymerizable compound is required to be made at least 30% by weight of the weight of the elements constituting the prepolymer $F_1$, and when the proportion is less than 30% by weight of the weight of the constituting elements, basic pigment is, in some cases, not dispersed at all or is not sufficiently dispersed in the emulsion.

The compound copolymerizable with the carboxyl group-containing, polymerizable compound used above includes those mentioned as to the polymer $A_1$ and these can be used alone or in admixture.

The prepolymer $F_1$ is a prepolymer having a weight average molecular weight of 1,000 to 30,000 obtained by solution-polymerizing the above-mentioned constituting elements in a known manner.

The solvent which can be used in the above solution-polymerization includes those mentioned as to the polymer $A_1$ and these can be used alone or in admixture; however, alcohols and ketones in which the carboxyl group-containing, polymerizable compound can be well dissolved are preferable.

The molecular weight of the prepolymer $F_1$ can be freely selected from the weight average molecular weight range of 1,000 to 30,000; however, when the molecular weight is less than 1,000, basic pigment cannot be well dispersed in the emulsion formed and when the molecular weight exceeds 30,000, the stability of the coating composition becomes inferior with some pigments, so that a weight average molecular weight of 1,500 to 10,000 is preferable.

The reactive prepolymer $F_2$ used in this invention is a polymerizable, reactive prepolymer having a polymerizable double bond and both epoxy group and acid group obtained by adding to the prepolymer $F_1$ an epoxy group-containing, polymerizable compound represented by the general formula (I) in a proportion of 0.1 to 1.0 equivalent per equivalent of the carboxyl group of the prepolymer $F_1$ in the presence of a polymerization inhibitor and a tertiary amino compound under a nitrogen 93%/oxygen 7% mixed gas stream at a temperature of 80 to 200° C.

The epoxy group-containing, polymerizable compound can be subjected to the above addition reaction in any proportion within the range of 0.1 to 1.0 equivalent per equivalent of the carboxyl group of the prepolymer $F_1$ to allow the reactive prepolymer $F_2$ to have a polymerizable double bond in the molecule; however, when the proportion exceeds 0.5 equivalent per equivalent of the carboxyl group, gelation is caused in some cases when the reactive prepolymer $F_2$ is copolymerized with at least one polymerizable compound, so that a proportion of 0.1 to 0.5 equivalent per equivalent of the carboxyl group is preferable.

The polymer $A_1$ may contain both the reactive prepolymer $E_2$ and the prepolymer $F_2$ each in a proportion of at least 0.5% by weight.

The proportion of the prepolymer $E_2$ which is one of the elements constituting the cationic emulsion of this invention can be freely selected from the range of 0.5 to 20% by weight of the weight of the elements constituting the cationic emulsion.

When the proportion of the prepolymer $E_2$ is less than 0.5% by weight of the weight of the elements constituting the cationic emulsion, acidic pigment is, in some cases, not dispersed at all or not sufficiently dispersed in the emulsion formed, and when the proportion exceeds 20% by weight, the weather resistance is remarkably deteriorated, and with some pigments, the stability of a coating composition becomes inferior, so that a proportion of 1.0 to 10% by weight is preferable.

The proportion of the prepolymer $F_2$ which is one of the elements constituting the cationic emulsion of this invention can be freely selected from the range of 0.5 to 30% by weight of the weight of the elements constituting the cationic emulsion.

When the proportion of the prepolymer $F_2$ is less than 0.5% by weight of the weight of the elements constituting the cationic emulsion, basic pigment is, in some cases, not dispersed at all or not sufficiently dispersed in the emulsion, and when the proportion exceeds 30% by weight, the stability of a coating composition becomes inferior with some pigments, so that a proportion of 1.0 to 15% by weight is preferable.

The cationic emulsion of this invention is made stable to alkalis by quaternizing the amino group with epichlorohydrin and the dispersibilities of various pigments having different polarities in the cationic emulsion are made good by the introduction of amphoteric polymer segments having both a basic prepolymer and an acidic prepolymer to prevent the restriction of acid-base interaction between a pigment and the resin as a dispersing agent. The reaction between the epichlorohydrin and the amino group of the emulsion D is effected by selectively adding the epoxy group to the amino group at 20 to 100° C. and then spontaneously reacting the chlorine atom with the amino group.

The cationic emulsion of this invention is excellent in adherability to strongly alkaline, inorganic substrates for building materials, and hence, can be used as a sealer. Moreover, since the coating film formed from the cationic emulsion is excellent in water resistance and gloss, the cationic emulsion is suitable as a coating resin for paper and plastic films. In addition, the cationic emulsion of this invention is excellent in dispersion of pigments among functional compounds in the emulsion, and hence, is suitable as a resin for dispersing a pigment and can be also used as a top coating for various paints.

DESCRIPTION OF THE PREFERRED EMBODIMENTS

Examples are shown below to explain this invention in more detail. In the Examples, part and % are by weight unless otherwise specified.

EXAMPLE 1

(Method for Preparing Basic Prepolymer)

In a flask equipped with a stirrer, a dropping funnel, a cooling tube and a thermometer was placed 47 parts by weight of butyl acetate, and heated to a temperature of 120° C. in a nitrogen atmosphere, after which a mixture of the following compositions (1) and (2) charged into the dropping funnel was dropwise added at a constant rate in 3 hours:

Composition (1)

| | |
|---|---|
| 4,4'-Azobis-4-cyanovaleric acid | 4.3 parts |
| Triethylamine | 1.4 parts |
| Cellosolve acetate | 22.0 parts |

Composition (2)

| | |
|---|---|
| Dimethylaminoethyl methacrylate | 17.3 parts |
| Butyl acetate | 5.0 parts |

30 Minutes after completion of the dropwise addition, 0.01 part of hydroquinone was added and then 3.6 parts of glycidyl methacrylate was added, after which the resulting mixture was subjected to reaction for a further 2 hours.

EXAMPLE 2

Method for Preparing Acidic Prepolymer

In a flask equipped with a stirrer, a dropping funnel, a cooling tube and a thermometer was placed 35 parts of butyl acetate and heated to 120° C. in a nitrogen atmosphere, after which the following composition (3) charged into the dropping funnel was dropwise added at a constant rate in 3 hours:

Composition (3)

| | |
|---|---|
| 2-Methacryloyloxyethylphthalic acid | 20.0 parts |
| Azobisisobutyronitrile | 4.0 parts |
| Butyl acetate | 10.0 parts |

30 Minutes after completion of the dropwise addition, 0.01 part of hydroquinone was added and then 2.0 parts of glycidyl methacrylate and 0.6 part of triethylamine were added thereto, after which the resulting mixture was subjected to reaction for a further 2 hours.

EXAMPLE 3

In a flask equipped with a stirrer, a dropping funnel, a cooling tube and a thermometer was placed 4 parts of ethanol and heated to 80° C. in a nitrogen atmosphere, after which the following composition (4) charged into the dropping funnel was dropwise added at a constant rate in 2 hours:

Composition (4)

| | |
|---|---|
| Methyl methacrylate | 9 parts |
| Butyl acrylate | 3 parts |
| Dimethylaminoethyl methacrylate | 3 parts |
| Azobisisobutyronitrile | 0.5 part |

After completion of the dropwise addition, the resulting mixture was kept at 80° C. for 3 hours, and thereafter, 1.2 parts of 88% formic acid was added, after which the resulting mixture was aged for a further 30 minutes and then diluted with 45 parts of water to obtain a cationic, water-soluble polymer.

Further, to this cationic, water-soluble resin were added 0.1 part of sodium ascorbate and 0.1 part of copper sulfate and the resulting mixture was kept at 80° C., after which each of the following compositions (5) and (6) was dropwise added simultaneously at a constant rate in 2 hours:

Composition (5)

| | |
|---|---|
| Styrene | 5 parts |
| Methyl methacrylate | 5 parts |
| Butyl acrylate | 5 parts |
| Glycidyl methacrylate | 0.3 part |

Composition (6)

| | |
|---|---|
| Hydrogen peroxide | 0.1 part |
| Water | 10 parts |

After completion of the dropwise addition, 2 parts of epichlorohydrin was added and then the resulting mixture was kept at 80° C. for a further 2 hours, cooled and thereafter diluted with 10 parts of water, after which the resulting mixture was taken out.

EXAMPLES 4 to 8

In the same manner as in Example 3, emulsions were obtained with the formulations shown in Table 1.

TABLE 1

| | Example | 4 | 5 | 6 | 7 | 8 |
|---|---|---|---|---|---|---|
| Water-soluble resin | Methyl methacrylate | 7 | 12 | 3 | 8 | 8 |
| | Butyl acrylate | 3 | 5 | 2 | 3 | 3 |
| | Dimethylaminoethyl methacrylate | 3 | 5 | 3 | 3 | 3 |
| | Basic prepolymer described in Example 1 | 0 | 0 | 1 | 0 | 0.5 |
| | Acidic prepolymer described in Example 2 | 0 | 0 | 0 | 1 | 0.5 |
| | Acrylic acid | 0 | 0 | 1 | 0 | 0 |
| | 2-Hydroxyethyl methacrylate | 2 | 0 | 0 | 0 | 0 |
| | Azobisisobutyronitrile | 0.5 | 1 | 0.5 | 0.5 | 0.5 |
| Oil-soluble resin | Styrene | 5 | 2 | 5 | 5 | 5 |
| | Methyl methacrylate | 3.5 | 4 | 12 | 5 | 5 |
| | Butyl acrylate | 5 | 2 | 5 | 5 | 5 |
| | Glycidyl methacrylate | 0.3 | 0.5 | 0.3 | 0.3 | 1 |
| | Acrylic acid | 1.5 | 0 | 0 | 0 | 0 |
| | Hydroxyethyl methacrylate | 0 | 2 | 0 | 0 | 0 |
| Epichlorohydrin | | 2 | 4 | 2 | 2 | 2 |
| Water-soluble resin/oil-soluble resin solid content ratio | | 50/50 | 70/30 | 30/70 | 50/50 | 50/50 |

COMPARATIVE EXAMPLES 1 to 5

In the same manner as in Example 3, emulsions were obtained with the formulations shown in Table 2.

TABLE 2

| | Comparative Example | 1 | 2 | 3 | 4 | 5 |
|---|---|---|---|---|---|---|
| Water-soluble resin | Methyl methacrylate | 11 | 11 | 9 | 12 | 7 |
| | Butyl acrylate | 3.5 | 3.5 | 3 | 5 | 5 |
| | Dimethylaminoethyl methacrylate | 0.5 | 0.5 | 3 | 5 | 0 |
| | Basic prepolymer described in Example 1 | 0 | 0 | 0 | 0 | 0 |
| | Acidic prepolymer described in Example 2 | 0 | 0 | 0 | 0 | 0 |
| | Acrylic acid | 0 | 0 | 0 | 0 | 3 |
| | 2-Hydroxyethyl methacrylate | 0 | 0 | 0 | 0 | 0 |
| | Azobisisobutyronitrile | 0.5 | 0.1 | 0.5 | 0.5 | 0.5 |
| Oil-soluble resin | Styrene | 5 | 5 | 5 | 2 | 5 |
| | Methyl methacrylate | 3.5 | 5 | 5 | 4 | 5 |
| | Butyl acrylate | 5 | 5 | 5 | 2 | 5 |
| | Glycidyl methacrylate | 0 | 0.3 | 0.3 | 0 | 0 |
| | Acrylic acid | 1.5 | 0 | 0 | 0 | 0 |
| | Hydroxyethyl methacrylate | 0 | 0 | 0 | 0 | 0 |
| Epichlorohydrin | | 2 | 2 | 0.1 | 2 | 2 |
| Water-soluble resin/oil-soluble resin solid content ratio | | 50/50 | 50/50 | 50/50 | 70/30 | 50/50 |

COMPARATIVE EXAMPLE 6

In a flask equipped with a stirrer, a dropping funnel, a cooling tube and a thermometer was placed 4 parts of ethanol and then heated to 80° C. under a nitrogen gas stream, after which the following composition (7) charged into the dropping funnel was dropwise added at a constant rate in 2 hours:

Composition (7)

| | |
|---|---|
| Methyl methacrylate | 9 parts |
| Butyl acrylate | 3 parts |
| Dimethylaminoethyl methacrylate | 3 parts |
| Azobisisobutyronitrile | 0.5 part |

After completion of the dropwise addition, the resulting mixture was kept at 80° C. for 3 hours and then 1.2 parts of 88% formic acid was added thereto, after which the resulting mixture was aged for a further 30 minutes and then diluted with 45 parts of water to obtain a cationic, water-soluble polymer.

Further, to this cationic, water-soluble resin were added 0.1 part of sodium ascorbate and 0.1 part of copper sulfate, and the resulting mixture was kept at 80° C., after which each of the following compositions (8) and (9) was dropwise added simultaneously at a constant rate in 2 hours:

| | |
|---|---|
| Styrene | 5 parts |
| Methyl methacrylate | 5 parts |
| Butyl acrylate | 5 parts |
| Glycidyl methacrylate | 0.3 part |

Composition (9)

| | |
|---|---|
| Hydrogen peroxide | 0.1 part |
| Water | 10 parts |

After completion of the dropwise addition, the resulting mixture was kept at 80° C. for 2 hours. Thereafter, the mixture was cooled to keep the temperature at 30° C. at which temperature 2 parts of epichlorohydrin was added. Thereafter, the resulting mixture was subjected to reaction at 30° C. for a further 2 hours and then diluted with 10 parts of water, and the diluted mixture was thereafter taken out.

COMPARATIVE EXAMPLES 7 to 11

In the same manner as in Example 6, emulsions were obtained with the formulations shown in Table 3 in which the temperature for addition reaction of epichlorohydrin was varied.

TABLE 3

| | Comparative Example | 7 | 8 | 9 | 10 | 11 |
|---|---|---|---|---|---|---|
| Water-soluble resin | Methyl methacrylate | 9 | 9 | 9 | 9 | 9 |
| | Butyl acrylate | 3 | 3 | 3 | 3 | 3 |
| | Dimethylaminoethyl methacrylate | 3 | 3 | 3 | 3 | 3 |
| | Basic prepolymer described in Example 1 | 0 | 0 | 0 | 0 | 0 |
| | Acidic prepolymer described in Example 2 | 0 | 0 | 0 | 0 | 0 |
| | Acrylic acid | 0 | 0 | 0 | 0 | 0 |
| | 2-Hydroxyethyl methacrylate | 0 | 0 | 0 | 0 | 0 |
| | Azobisisobutyronitrile | 0.5 | 0.5 | 0.5 | 0.5 | 0.5 |
| Oil-soluble resin | Styrene | 5 | 5 | 5 | 5 | 5 |
| | Methyl methacrylate | 5 | 5 | 5 | 5 | 5 |
| | Butyl acrylate | 5 | 5 | 5 | 5 | 5 |
| | Glycidyl methacrylate | 0.3 | 0.3 | 0.3 | 0.3 | 0.3 |
| | Acrylic acid | 0 | 0 | 0 | 0 | 0 |
| | Hydroxyethyl methacrylate | 0 | 0 | 0 | 0 | 0 |
| | Hydrogen peroxide | 0.1 | 0.1 | 0.1 | 0.1 | 0.1 |
| Epichlorohydrin | | 2 | 2 | 2 | 2 | 0.05 |
| Epichlorohydrin-addition reaction temperature (° C.) | | 40 | 60 | 100 | 5 | 80 |
| Water-soluble resin/oil-soluble resin solid content ratio | | 50/50 | 50/50 | 50/50 | 50/50 | 50/50 |

The properties of the varnishes obtained in Examples 3 to 8 and Comparative Examples 1 to 11 were as shown in Tables 4 to 6.

TABLE 4

(Properties of varnishes)

| Example | 3 | 4 | 5 | 6 | 7 | 8 |
|---|---|---|---|---|---|---|
| Non-volatile matter content (%) | 31.0 | 30.8 | 30.0 | 30.5 | 30.7 | 30.2 |
| Viscosity (BM type) (ps) | 0.2 | 0.5 | 0.2 | 0.3 | 0.2 | 0.3 |
| Weight average molecular weight of water-soluble resin | 20000 | 13000 | 20000 | 21000 | 20000 | 21000 |
| pH | 5.1 | 4.9 | 5.3 | 5.2 | 5.2 | 5.1 |
| Average particle diameter (μm) | 0.05 | 0.04 | 0.07 | 0.05 | 0.05 | 0.04 |

TABLE 5

(Properties of varnishes)

| Comparative Example | 1 | 2 | 3 | 4 | 5 |
|---|---|---|---|---|---|
| Non-volatile matter content (%) | Deposited | 30.1 | 30.3 | 30.6 | 30.7 |
| Viscosity (BM type) (ps) | | 1.0 | 0.2 | 0.8 | 0.2 |
| Weight average molecular weight of water-soluble resin | | 200000 | 21000 | 20000 | 19000 |
| pH | | 5.0 | 4.8 | 5.2 | 8.1 |
| Average particle diameter (μm) | | 0.2 | 0.05 | 0.04 | 0.06 |

TABLE 6

(Properties of varnishes)

| Comparative Example | 6 | 7 | 8 | 9 | 10 | 11 |
|---|---|---|---|---|---|---|
| Non-volatile matter content (%) | 30.0 | 30.0 | 29.8 | 30.4 | 30.1 | 30.2 |
| Viscosity (BM type) (ps) | 0.4 | 0.2 | 0.3 | 0.4 | 0.3 | 0.3 |
| Weight average molecular weight of water-soluble resin | 21000 | 20000 | 19000 | 20000 | 22000 | 21000 |
| Weight average | 300000 | 310000 | 290000 | 300000 | 290000 | 300000 |

TABLE 6-continued (Properties of varnishes)

| Comparative Example | 6 | 7 | 8 | 9 | 10 | 11 |
|---|---|---|---|---|---|---|
| molecular weight of oil-soluble resin | | | | | | |
| pH | 6.1 | 5.0 | 5.8 | 6.0 | 4.9 | 5.6 |
| Average particle diameter ($\mu$m) | 0.05 | 0.06 | 0.05 | 0.04 | 0.06 | 0.06 |

EXAMPLE 9

In a flask equipped with a stirrer, a dropping funnel, a cooling tube and a thermometer was placed 4 parts of ethanol and heated to 80° C. under a nitrogen gas stream, and the following composition (10) charged into the dropping funnel was dropwise added at a constant rate in 2 hours:

Composition (10)

| Methyl methacrylate | 9 parts |
|---|---|
| Butyl acrylate | 3 parts |
| Dimethylaminoethyl methacrylate | 3 parts |
| Azobisisobutyronitrile | 0.5 part |

After completion of the dropwise addition, the resulting mixture was kept at 80° C. for 3 hours and thereafter 1.2 parts of 88% formic acid was added thereto, after which the resulting mixture was aged for a further 30 minutes and then diluted with 45 parts of water to obtain a cationic, water-soluble polymer.

Further, to this cationic, water-soluble polymer were added 0.1 part of sodium ascorbate and 0.1 part of copper sulfate, and the resulting mixture was kept at 80° C. at which temperature each of the following compositions (11) and (12) was simultaneously dropwise added at a constant rate in 2 hours:

Composition (11)

| Styrene | 5 parts |
|---|---|
| Methyl methacrylate | 5 parts |
| Butyl acrylate | 5 parts |
| Glycidyl methacrylate | 0.3 part |

Composition (12)

| Hydrogen peroxide | 0.1 part |
|---|---|
| Water | 10 parts |

After completion of the dropwise addition, the resulting mixture was kept at 80° C. for a further 2 hours and then diluted with 10 parts, after which the diluted mixture was taken out. Six samples (each 100 parts) of the emulsion obtained were kept at six temperatures of 5° C., 20° C., 40° C., 60° C., 80° C. and 100° C., respectively, to carry out addition reaction of epichlorohydrin, and the time required until the emulsion became alkali resistant was measured.

EXAMPLE 10

Using the varnish obtained in Example 3, pigment dispersion was conducted with the following paint formulations by use of a paint shaker to obtain a black paint and a white paint:

Paint Formulations

Mill Base Formulation

| Carbon | 7.0 parts |
|---|---|
| Varnish | 32.0 parts |
| Water | 31.0 parts |
| | 70 parts |
| Titanium oxide | 40.0 parts |
| Varnish | 20.9 parts |
| Water | 15.0 parts |
| | 75.0 parts |

Let Down Formulation

| Black mill base | 22.0 parts |
|---|---|
| Varnish | 66.0 parts |
| Water | 12.0 parts |
| | 100.0 parts |
| White mill base | 40.0 parts |
| Varnish | 54.0 parts |
| Water | 6.0 parts |
| | 100.0 parts |

With 10 parts of toluene were diluted 90 parts of the above white fundamental color and 10 parts of the above black fundamental color and the mixture obtained was applied to a glass plate by an applicator to form a coating film of 100 micron in thickness, after which the coating film was rubbed just before set to touch, and the color difference between the rubbed portion and the unrubbed portion was measured.

Method of Measuring the Adhesive Strength After Dipping in Water

A slate was coated with one of the emulsions obtained in the above Examples and Comparative Examples, in which emulsions the solid content had been adjusted to 15%, in a proportion of 100 g/m² and the coated slate plate was allowed to stand at room temperature for 7 days, then immersed in tap water for 10 days, and thereafter dried at room temperature for 1 day, after which the dried coating film was subjected to adhesive strength test based on the cross-cut test in which the coating film was cross-cut to 100 squares of 1 mm×1 mm. The results obtained are shown in Tables 7 to 9 in which 100 squares left without peeling is indicated as ⊚, 99 to 90 squares left as ○, 89 to 80 squares left as Δ, 79 to 70 squares left as X and not more than 69 squares left as XX.

Adhesive Strength

Each substrate was coated with one of the emulsions obtained in the Examples and Comparative Examples, in which emulsion the solid content had been adjusted to 15%, in a proportion of 100 g/m² and the coated substrate was allowed to stand at room temperature for 7 days, after which the coating film was subjected to adhesive strength test based on the cross-cut test in which the coating film was cross-cut to 100 squares of 1 mm×1 mm. The results obtained are shown in Tables 7 to 9 in which 100 squares left without peeling is indicated as ⊚, 99 to 90 squares left as ○, 89 to 80 squares left as Δ, 79 to 70 squares left as X and not more than 69 squares left as XX.

Alkali Resistance

A 3% aqueous sodium hydroxide solution was added to 100 parts of the emulsion obtained in the Examples and Comparative Examples and the resulting mixture was stirred, after which the amount of the resin deposited was determined in weight % to evaluate the alkali resistance. The results obtained are shown in Tables 7 to 9 in which ⊚ means no deposition, ○ means that the amount of resin deposited was not more than 2%, Δ means that the amount was not more than 5%, X means that the amount was not more than 10% and XX means that the amount was more than 10%.

Method of Evaluation of the Time Required Until the Emulsion Have a Good Alkali Resistance at the Addition Reaction Temperature A 3% aqueous sodium hydroxide solution was added to the emulsion obtained in Example 9 and the resulting mixture was stirred, after which the time required until the amount of resin deposited became not more than 1% was measured. The results obtained are shown in Table 10.

TABLE 7

(Coating composition test results)

| Example | | 3 | 4 | 5 | 6 | 7 | 8 |
|---|---|---|---|---|---|---|---|
| Adhesive strength after dipping in water | | ⊚ | ⊚ | ⊚ | ⊚ | ⊚ | ⊚ |
| Alkali-resistance | | ⊚ | ⊚ | ⊚ | ⊚ | ⊚ | ⊚ |
| Adhesive | Slate plate | ⊚ | ⊚ | ⊚ | ○ | ⊚ | ⊚ |
| strength | Polystyrene | ⊚ | ⊚ | ⊚ | ⊚ | ⊚ | ⊚ |
| | Polyurethane | ⊚ | ⊚ | ⊚ | ⊚ | ⊚ | ⊚ |
| | ABS plate | ⊚ | ⊚ | ⊚ | ⊚ | ⊚ | ⊚ |
| Black pigment dispersibility | | Δ | ○ | Δ | ⊚ | ○ | ⊚ |
| White pigment dispersibility | | Δ | Δ | Δ | ○ | ⊚ | ⊚ |
| Flooding | | Δ | Δ | Δ | ○ | ○ | ⊚ |

TABLE 8

(Coating composition test results)

| Comparative Example | | 1 | 2 | 3 | 4 | 5 |
|---|---|---|---|---|---|---|
| Adhesive strength after dipping in water | | Impossible to evaluate | ⊚ | X | XX | ⊚ |
| Alkali-resistance | | | ⊚ | XX | ⊚ | ⊚ |
| Adhesive | Slate plate | | Δ | Δ | ⊚ | XX |
| strength | Polystyrene | | Δ | ⊚ | ⊚ | X |
| | Polyurethane | | Δ | ⊚ | ⊚ | X |
| | ABS plate | | Δ | ⊚ | ⊚ | X |
| Black pigment dispersibility | | | Δ | Δ | Δ | ○ |
| White pigment dispersibility | | | X | Δ | Δ | ○ |
| Flooding | | | X | Δ | Δ | Δ |

TABLE 9

(Coating composition test results)

| Comparative Example | | 6 | 7 | 8 | 9 | 10 | 11 |
|---|---|---|---|---|---|---|---|
| Adhesive strength after dipping in water | | X | Δ | ○ | ⊚ | X | X |
| Alkali-resistance | | XX | Δ | ○ | ⊚ | XX | X |
| Adhesive | Slate plate | XX | X | Δ | ⊚ | XX | X |
| strength | Polystyrene | ⊚ | ⊚ | ⊚ | ⊚ | ⊚ | ⊚ |
| | Polyurethane | ⊚ | ⊚ | ⊚ | ⊚ | ⊚ | ⊚ |
| | ABS plate | ⊚ | ⊚ | ⊚ | ⊚ | ⊚ | ⊚ |
| Black pigment dispersibility | | Δ | Δ | Δ | Δ | Δ | Δ |
| White pigment dispersibility | | Δ | Δ | Δ | Δ | Δ | Δ |
| Flooding | | Δ | Δ | Δ | Δ | X | Δ |

The method of evaluating flooding is as follows:
ΔE Less than 0.3: ⊚
0.3 to 0.5: ○
0.5 to 1.0: Δ
1.0 to 3.0: X
More than 3.0: XX The method of evaluating weather resistance is as follows:
ΔE Less than 0.5: ⊚
0.5 to 1.0: ○
1.0 to 2.0: Δ
2.0 to 3.0: X
More than 0.3: XX

TABLE 10

(Time required until emulsion becomes alkali resistant at addition reaction temperature)

| Addition reaction temperature (° C.) | Time (hrs) |
|---|---|
| 5 | Not reacted even after 300 hrs |
| 20 | 78 |
| 40 | 23 |
| 60 | 8 |
| 80 | 1 |
| 100 | 1 |

When the cationic emulsion of this invention is used, the dispersibility of various compounds having functionality such as pigments and the like are improved and the function of a sealer, primer or the like for building materials can be provided which develops good adherability to paper, plastic films or inorganic substrates and water resistance based on the stability to alkalis and the effect of fine particles. Therefore, the cationic emulsion can be employed in various uses such as paint, ink and the like.

What is claimed is:
1. A process for producing a cationic emulsion that is stable to alkalis and has an average particle diameter of 0.01 to 0.1 micron, comprising the following steps:
    preparing a water-soluble polymer $A_2$ by
        first preparing a polymer $A_1$, having a weight average molecular weight of 5,000 to 100,000, by copolymerizing an amino group-containing compound with a compound copolymerizable therewith in the presence of a polymerization initiator, and
    subjecting polymer $A_1$ to neutralization with an organic or inorganic acid in a proportion of 0.5 to 1.5 equivalents per equivalent of the amino group of said amino group-containing polymerizable compound;

preparing an emulsion D comprising an emulsion polymer having a weight average molecular weight of at least 100,000 and having a core/shell structure wherein the core portion is an oil soluble polymer, $B_1$, and the shell portion is said polymer $A_2$, which core and shell are integrated by the bonding of an epoxy group in said polymer $B_1$ with the amine groups of said polymer $A_2$, wherein said emulsion polymer is made by subjecting an epoxy group-containing compound C represented by the general formula (I):

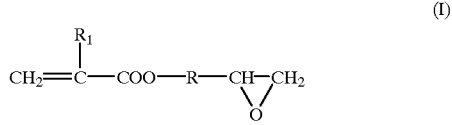

(I)

wherein $R_1$ represents H or a methyl group and R represents a straight chain or branched chain alkyl group having 1 to 10 carbon atoms, and a compound copolymerizable with the compound C to emulsion polymerization in the presence of $A_2$, wherein the proportion of the epoxy group in compound C to the amino groups in polymer $A_2$ is 0.01 to 0.5 on an equivalent basis, in the presence of a redox catalyst system in water; and finally reacting said emulsion D with epichlorohydrin in an amount of at least 0.5 equivalent per equivalent of said amino groups of polymer $A_2$ at a temperature of 20 to 100° C. to result in said cationic emulsion.

2. The process for producing a cationic emulsion according to claim 1, wherein the polymer $A_1$ contains a polymerizable prepolymer $E_2$ having a polymerizable double bond having both an amino group and an acid group wherein said $E_2$ is obtained by first preparing a prepolymer $E_1$ having a weight average molecular weight of 1,000 to 30,000 by copolymerizing an amino group-containing, polymerizable compound with a compound copolymerizable therewith in the presence of a terminal carboxyl group-containing polymerization initiator, and reacting said prepolymer $E_1$ with an epoxy group-containing compound represented by the general formula (I) in a proportion of 0.1 to 1.0 equivalent per equivalent of the amino groups of said amino group-containing, polymerizable compound.

3. The process for producing a cationic emulsion according to claim 1, wherein the polymer $A_1$ contains a polymerizable prepolymer $F_2$ obtained by first preparing a prepolymer $F_1$ having a weight average molecular weight of 1,000 to 30,000 by copolymerizing a carboxyl group-containing, polymerizable compound with a compound copolymerizable therewith in the presence of a carboxyl group-containing initiator and/or at least one other polymerization initiator, and reacting said prepolymer $F_1$ with an epoxy group-containing compound represented by the general formula (I) wherein the proportion of said epoxy group-containing compound represented by the general formula (I) to the carboxyl group of said carboxyl groups-containing polymerizable compound is 0.1 to 1.0 on an equivalent per equivalent basis of the carboxyl group.

4. The process for producing a cationic emulsion according to claim 2, wherein the prepolymer $A_1$ contains the prepolymer $E_2$ and the prepolymer $F_2$ as defined below, each in a proportion of at least 0.5% by weight of the weight of the elements constituting the cationic emulsion, wherein prepolymer $F_2$ is obtained by first preparing a prepolymer $F_1$ having a weight average molecular weight of 1,000 to 30,000 by copolymerizing a carboxyl group containing, polymerizable compound with a compound copolymerizable therewith in the presence of a carboxyl group-containing initiator and/or at least one other polymerization initiator, and reacting said prepolymer $F_1$ with an epoxy group-containing compound represented by the general formula (I) wherein the proportion of said epoxy group-containing compound represented by the general formula (I) to the carboxyl group of said carboxyl group-containing polymerizable compound is 0.1 to 1.0 on an equivalent per equivalent basis.

5. The process for producing a cationic emulsion according to claim 1, wherein the oil-soluble polymer $B_1$ constituting the oil-soluble core portion comprises one or more carboxyl group-containing, monomeric units.

6. The process for producing a cationic emulsion according to claim 1, wherein the oil-soluble polymer $B_1$ constituting the oil-soluble core portion comprises one or more carboxyl group-containing, monomeric units.

7. A cationic emulsion produced by the production process according to claim 1.

8. An article coated with a cationic emulsion produced by the production process according to claim 1.

* * * * *